United States Patent
Omekanda et al.

(10) Patent No.: US 6,894,486 B2
(45) Date of Patent: May 17, 2005

(54) MAGNETIC ENCODER WITH DOUBLE FREQUENCY OUTPUT

(75) Inventors: Avoki M. Omekanda, Rochester, MI (US); Bruno P. B. Lequesne, Troy, MI (US); Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/675,694

(22) Filed: Sep. 30, 2003

(65) Prior Publication Data

US 2005/0068022 A1 Mar. 31, 2005

(51) Int. Cl.⁷ .................................. G01B 7/30
(52) U.S. Cl. ...................... 324/207.22; 324/207.2; 324/207.21; 324/207.25
(58) Field of Search .............. 324/207.11, 207.13, 324/207.15, 207.21, 207.22, 207.23, 207.25, 173.174, 179

(56) References Cited

U.S. PATENT DOCUMENTS

| 4,835,467 | A | | 5/1989 | Gokhale ................. 324/166 |
| 4,926,122 | A | | 5/1990 | Schroeder et al. ..... 324/207.13 |
| 4,939,456 | A | | 7/1990 | Morelli et al. ......... 324/207.21 |
| 6,528,992 | B2 | * | 3/2003 | Shinjo et al. .......... 324/207.21 |
| 2001/0045827 | A1 | * | 11/2001 | Shinjo et al. .......... 324/207.21 |
| 2002/0180427 | A1 | | 12/2002 | Schroeder et al. ..... 324/207.24 |

* cited by examiner

*Primary Examiner*—Bot LeDynh
(74) *Attorney, Agent, or Firm*—Jimmy L. Funke

(57) ABSTRACT

A magnetic sensor has magnetically sensitive element located at a side surface, instead of the bottom surface, of a bias magnet, the magnet being located adjacent a magnetic target wheel, wherein the bias magnet is magnetized parallel to the direction of motion of the teeth/slots of the target wheel. The output may be of a single or double frequency. Sampling of output slope can provide information regarding direction of movement of the target wheel. In a second embodiment the bias magnet is magnetized perpendicular to the movement.

17 Claims, 4 Drawing Sheets

MAGNETIC ENCODER WITH DOUBLE FREQUENCY OUTPUT

TECHNICAL FIELD

The present invention relates to magnetosensitive or galvanomagnetic devices (e.g. Hall generators, magnetoresistors, etc.) for use as encoders to determine position and speed.

BACKGROUND OF THE INVENTION

It is well known in the art that magnetic sensors can be employed in position and speed sensors with respect to moving ferromagnetic materials or objects (see for example U.S. Pat. Nos. 4,835,467, 4,926,122, and 4,939,456). In such applications, the magnetic sensor is biased with a magnetic field and electrically excited, typically, with a constant current source or a constant voltage source. A magnetic (i.e., ferromagnetic) object rotating relative, and in close proximity, to the magnetic sensor, such as a toothed wheel, produces a varying magnetic flux density through the magnetic sensor.

FIG. 1A is an example of a magnetic sensor 50 according to the prior art, wherein the magnetic sensor element 10 is mounted on the bottom surface 12 of a permanent magnet (bias magnet) 14 magnetized in a direction 16 perpendicular to the direction of motion 18 of target wheel 20 having teeth 22 and slots 24. The total package thickness 26 is determined by the thickness 30 of the magnetic sensor element 10, incorporating protection and electrical connections for the magnetic sensor element, and the magnet length 32. The magnet length 32 cannot be small since it determines the magnetic signal strength detected by magnetic sensor element 10 and a total package thickness 26 of 5 millimeters or more is common.

The resolution of magnetic sensor 50 is related to the number of teeth 22 of target wheel 20. In some cases, the number of teeth 22 is fixed by external constraints, for instance, when target wheel 20 is a gear used for both mechanical advantage and for position sensing. The number of teeth 22, in such a case, may not be sufficient to provide the desired resolution.

FIG. 1B is a plot 52 of the magnetic flux density detected by the magnetic sensor 50 according to the prior art of FIG. 1A as the target wheel 20 passes the magnetic sensor. The larger magnetic flux density 22' represents the passage of a tooth 22 past the sensor 50 whereas the smaller magnetic flux density 24' represents the passage of a slot 24 past the sensor.

Accordingly, what is needed in the art is a more robust magnetic sensor configuration enabling a smaller total package thickness and a means for increasing the resolution of the magnetic sensor.

SUMMARY OF THE INVENTION

The present invention is a magnetic sensor (magnetic encoder) utilizing magnetosensitive or galvanomagnetic devices, herein referred to as magnetically sensitive (MS) elements, much thinner than prior art magnetic sensors, providing similar functionality and, with appropriate design parameters, can double the resolution of prior art magnetic sensors utilizing the same target wheel. The present invention also has the capability to directly provide direction of rotation information of the target wheel.

The magnetic sensor senses changes in the magnetic flux density as the target wheel moves relative to the magnet and outputs a signal representing changes in the magnetic flux density. Preferably, the MS element is a Hall effect sensor or device, a semiconductor magnetoresistor (SMR), a permalloy magnetoresistor (PMR), or a giant magnetoresistor (GMR). If a Hall sensor or a semiconductor magnetoresistor is used, it senses a component of the magnetic flux density that is normal to its surface. On the other hand, if a permalloy magnetoresistor or a giant magnetoresistor is used, it senses the component of magnetic flux density which is co-planar, or parallel, to its surface.

In a first preferred embodiment of the present invention, a magnetic sensor consists of an MS element located at a side surface, instead of the bottom surface, of a stationary permanent magnet, the magnet being located adjacent a magnetic target wheel, wherein the permanent magnet is magnetized parallel to the direction of motion of the surface of a magnetic target wheel. Proper selection of magnetic sensor dimensions enables changes in magnetic flux density upon the passage of one tooth and one slot of the target wheel (one tooth pitch) past the magnetic sensor to be represented as a single or double frequency magnetic sensor output. For the single frequency magnetic sensor output, a single cycle of changes in magnetic flux density consisting of one minimum and one maximum is output by the magnetic sensor upon the passage of one tooth and one slot of the target wheel (one tooth pitch) past the magnetic sensor. Whereas for the double frequency magnetic sensor output, two cycles of changes in magnetic flux density consisting of two minima and two maxima are output by the magnetic sensor upon the passage of one tooth and one slot (one tooth pitch) of the target wheel past the magnetic sensor, thereby increasing the resolution by doubling the frequency of the output signal.

In a second preferred embodiment of the present invention, a magnetic sensor consists of an MS element located on a side surface, instead of the bottom surface, of a stationary permanent magnet wherein the permanent magnet is magnetized perpendicular to the direction of motion of the surface of a magnetic target wheel.

Accordingly, it is an object of the present invention to provide a magnetic sensor having a total package thickness much smaller than Prior Art magnetic sensors with similar functionality.

These and additional objects, features and advantages of the present invention will become clearer from the following specification of a preferred embodiment.

DESCRIPTION OF THE PREFERRED EMBODIMENT

Figure 2:
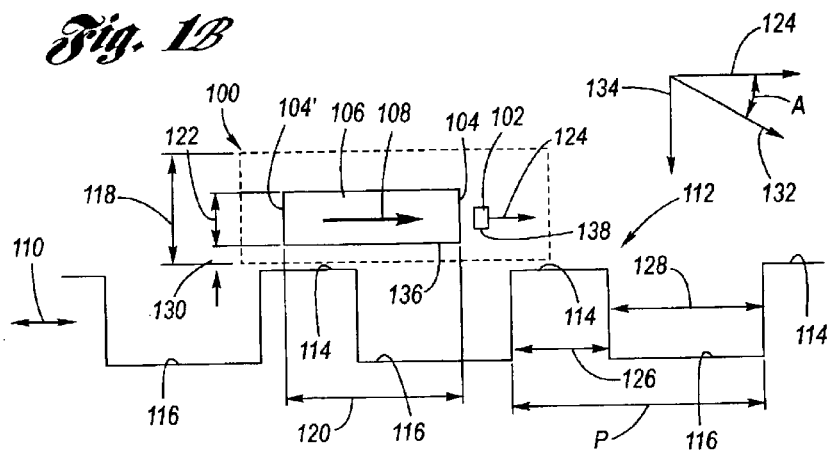
FIG. 2 depicts a first preferred embodiment of a magnetic sensor according to the present invention.

FIG. 2 depicts a first preferred embodiment of a magnetic sensor 100 according to the present invention. The magnetic sensor 100 incorporates a magneto sensitive (MS) element 102 adjacent in facing relation to side surface 104 or 104' (shown facingly adjacent to side surface 104 in FIG. 2) of a permanent magnet (bias magnet) 106 magnetized in a direction 108 parallel to the direction of motion 110 of a target wheel 112 having teeth 114 and slots 116, wherein the MS element 102 is sensitive to the component 124 (the detected magnetic flux density) of magnetic flux density 132 which is parallel to the direction of motion of the target wheel and parallel to the direction of magnetization of the permanent magnet, and wherein the component 134 of the magnetic flux density is perpendicular to component 124. The location of the MS element 102 facingly adjacent the permanent magnet side surface 104 or 104', rather than between the magnet 106 and target wheel 112, decreases the overall package thickness 118 compared to the aforedescribed prior art magnetic sensor 50, since the MS element, connecting wires, leadframe, bonding, and protective layers (not shown) are now removed from the overall thickness. The most preferred placement of the MS element 102 on the permanent magnet side surface 104 or 104' is nearest the bottom surface 136 of permanent magnet 106, wherein the lower edge 138 of the MS element aligned with the bottom surface of the permanent magnet. Another advantage of the present invention is that the MS element 102 and its connections (not shown), which are the most fragile parts, are located away from the target wheel 112 resulting in a more robust design. Additionally, the magnetic sensor 100 is also more amenable to electronic integration, in that the MS element 102 can more easily be connected or combined with electronic circuitry (not shown). The permanent magnet length 120 determines the magnetic field strength (magnetic flux density) 132 and, thus, the strength of magnetic field components 124, 134 (see inset of FIG. 2). Whereas the permanent magnet width 122, by contrast, is not a significant design constraint for semiconductor sensor elements and can be reduced to obtain an overall very thin package. The permanent magnet width 122 is limited by the mechanical strength necessary for the application.

It is to be understood that the MS element 102 can be, for example, a Hall effect device, a semiconductor magnetoresistor (SMR), a permalloy magnetoresistor (PMR), or a giant magnetoresistor (GMR). For ease of discussion, the MS elements 102 can be divided into two types: type A elements and type B elements. Type A elements include Hall effect devices and SMRs. On the other hand, type B elements include PMRs and GMRs. It is to be appreciated that the type A elements are sensitive to the component of magnetic flux density, for example 124, that is perpendicular to their surfaces. On the other hand, type B elements are sensitive to the component of magnetic flux density, for example 124, that is parallel to their surfaces. A type A MS element 102 is depicted in FIG. 2 wherein the component of magnetic flux density 124 is perpendicular to the surface 131 of the MS element.

Figure 3:
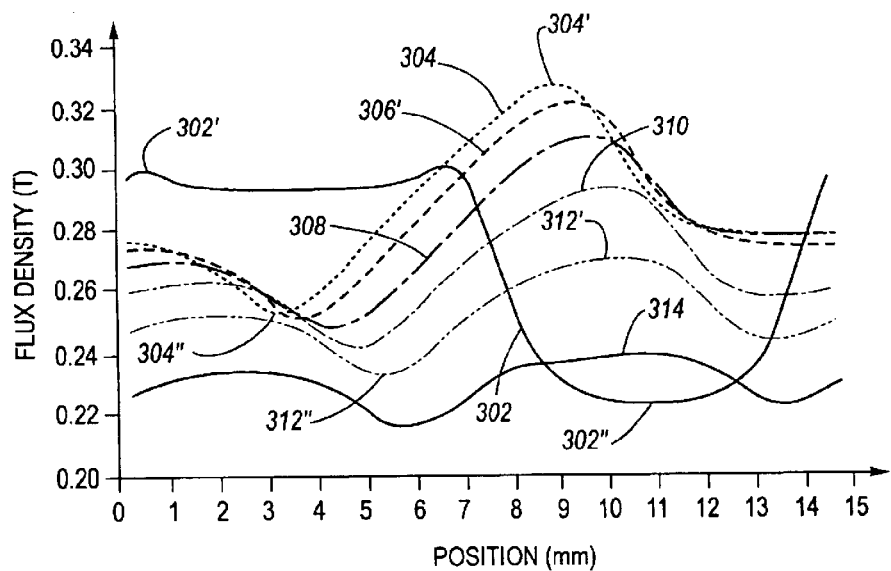
FIG. 3 is a first graph of detected magnetic flux densities according to the first preferred embodiment of the present invention.
Figure 4:
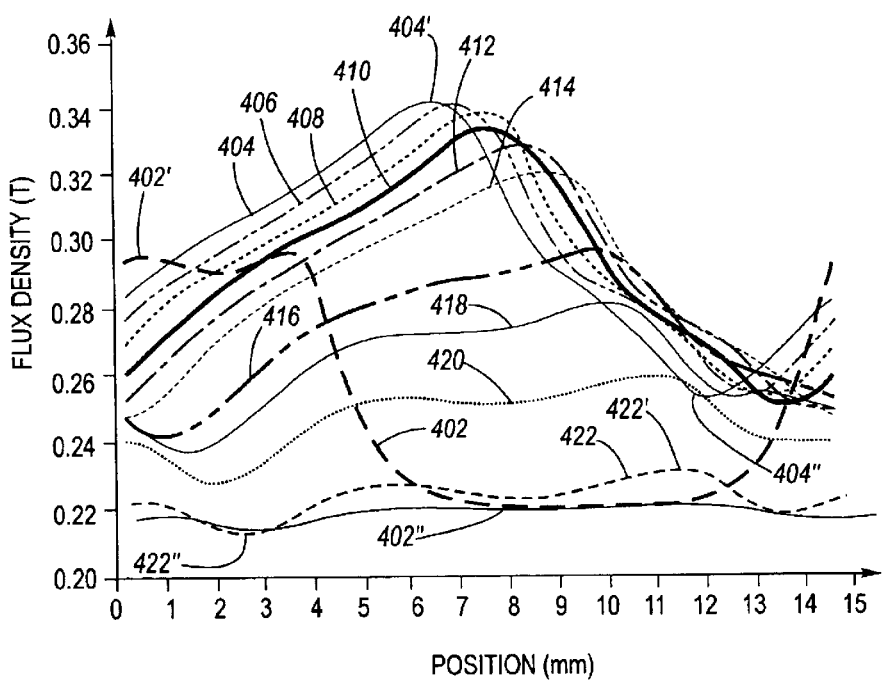
FIG. 4 is a second graph of detected magnetic flux densities according to the first preferred embodiment of the present invention.

FIGS. 3 and 4 are examples of first and second graphs of plots 302 through 314 and 402 through 422, respectively, of magnetic flux densities 124 detected by MS element 102 for one tooth pitch P of 14.5 millimeters according to the first preferred embodiment of the present invention shown at FIG. 2, using finite element simulation for various permanent magnet lengths 120, wherein the MS element is, for example, a type A element. The distance 130 (magnetic air gap) between the bottom surface 136 of the magnet 106 and the top of the teeth 114 is 0.7 millimeters, consisting of a 0.2 millimeter protective layer for the sensor 100 and 0.5 millimeters mechanical clearance between the target wheel 112 and the protective layer (not shown).

Figure 1A:
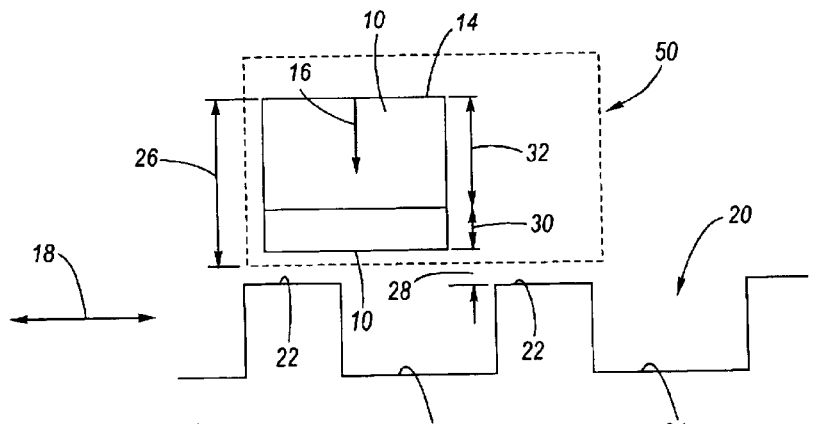
FIG. 1A is an example of a prior art magnetic sensor.

Shown for comparison of the prior art magnetic sensor 50 is plot 302 in FIG. 3 and plot 402 in FIG. 4, wherein the distance 28 (magnetic air gap) in FIG. 1A is 1.5 millimeters, consisting of a 1 millimeter protective layer for the sensor 50 and 0.5 millimeters mechanical clearance between the target wheel 20 and the protective layer (not shown). In FIG. 3, the tooth width 126 and slot width 128 are the same, 7.25 millimeters, whereas in FIG. 4 the tooth width is 4 millimeters and the slot width is 10.5 millimeters. The larger magnetic flux density 302' and 402' for the prior art magnetic sensor plot 302 in FIG. 3 and plot 402 in FIG. 4, respectively, represent the passage of a tooth 22 past the magnetic sensor 50 depicted as 22' in FIG. 1B, whereas the smaller magnetic flux density 302" and 402" for the prior art magnetic sensor plot 302 in FIG. 3 and plot 402 in FIG. 4, respectively, represent the passage of a slot 24 past the magnetic sensor 50 depicted as 24' in FIG. 1B. In FIGS. 3 and 4, the permanent magnet length 120 determines the strength of the magnetic flux density 132 and, thus, the strength of magnetic field components 124, 134.

Plots 304, 306, 308, and 310 in FIG. 3 represent permanent magnet lengths 120 of 8 mm, 7 mm, 6 mm, and 5 mm, respectively, each showing one minimum and one maximum per tooth pitch P representing single frequency magnetic sensor 100 outputs, wherein the minima and maxima have, approximately, the same variations of magnetic flux densities 124. Plots 404, 406, 408, 410, 412, 414, 416, and 418 in FIG. 4 represent permanent magnet lengths 120 of 13 mm, 12 mm, 11 mm, 10 mm, 9 mm, 8 mm, 6 mm, and 5 mm, respectively, each showing one minimum and one maximum representing single frequency magnetic sensor 100 outputs, wherein the minima and maxima have, approximately, the same variations of magnetic flux densities 124.

As can be seen from FIGS. 3 and 4, the plots, wherein the minima and maxima have, approximately, the same relatively large variations of magnetic flux densities 124 (the best plots) for single frequency magnetic sensor 100 output, are obtained for a permanent magnet length 120 longer than 4 mm, for example plot 310 in FIG. 3, and at least 5 mm, for example plot 418 in FIG. 4. Related to the slot width 128 of FIGS. 3 and 4, the permanent magnet length 120 must be at least 50% of the slot width and, preferably, between 70% and 100% of the slot width for a single frequency output of magnetic sensor 100.

Plots 310, 312, and 314 in FIG. 3 represent permanent magnet lengths 120 of 5 mm, 4 mm, and 3 mm, respectively, each showing two minima and two maxima per tooth pitch P representing double frequency magnetic sensor 100 outputs for one tooth pitch P, wherein the minima and maxima have, approximately, the same variations of magnetic flux densities 124. For a permanent magnet length 120 of 5 mm (plot 310), the double frequency is clear, but the variation of magnetic flux density 124 between the maxima and minima is small.

Referring now to FIG. 4, the double frequency is somewhat clear for plots 418, 420, and 422 representing permanent magnet lengths 120 of 5 mm, 4 mm, and 3 mm, respectively, but the variation of magnetic flux density 124 between the maxima and minima is small. Hence, as can be seen from FIGS. 3 and 4, the plots, wherein the minima and maxima have, approximately, the same relatively large variations of magnetic flux densities 124 (the best plots) for double frequency magnetic sensor 100 output, are obtained for a permanent magnet length 120, preferably, no longer than 50% of the slot width 128 whereby the tooth width 126 and slot width are, preferably, the same.

Maxima, for example 304', 312' in FIGS. 3 and 404', 422' in FIG. 4, are obtained if any two of the following three conditions are achieved:

Condition 1: There is a large magnetic flux density 132 due to the proximity of a tooth 114 in front of the MS element 102 (i.e. on the right side surface of the MS element depicted in FIG. 2) resulting in a large magnetic flux component 124 albeit the angle A in FIG. 2 may be large.

Condition 2: The angle A is small resulting in a large magnetic flux component 124 of magnetic flux density 132.

Condition 3: There is a low reluctance magnetic flux return path due to the proximity of a tooth 114 near the back side surface (see 104' in FIG. 2) of permanent magnet 106 (in other words, the side surface opposite the MS element 102).

Minima, for example 304", 312" in FIG. 3 and 404", 422" in FIG. 4, are obtained if, at most, only one of the previous three conditions is achieved.

Single frequency maxima, for example 304', 312' in FIG. 3 and 404', 422' in FIG. 4, are obtained with a permanent magnet length 120 about as long as the slot width 128, as previously described, thereby satisfying conditions 1 and 3 mentioned above, once per tooth pitch P, when the permanent magnet subtends the slot width resulting in a maximum once per tooth pitch. Single frequency minima, for example 304", 312" in FIG. 3 and 404", 422" in FIG. 4, are obtained with a permanent magnet length 120 more than 50% of the slot width 128, as previously described, thereby satisfying one of the three conditions above once per tooth pitch P when the permanent magnet subtends approximately half the slot width resulting in a minimum once per tooth pitch. Therefore, a permanent magnet length 120 about as long as the slot width 128 results in a single frequency output with one maxima and one minima per tooth pitch P.

Figure 5:
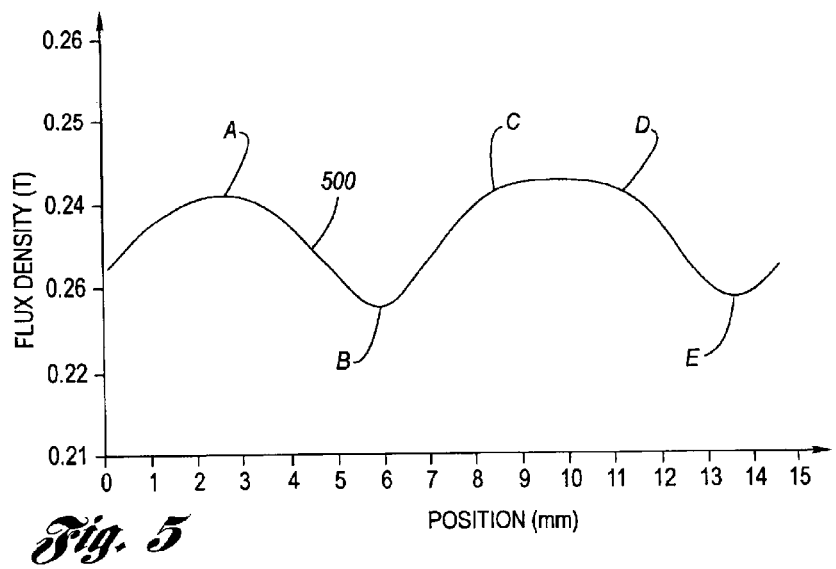
FIG. 5 is a third graph of detected magnetic flux densities according to the first preferred embodiment of the present invention.
Figure 6A:
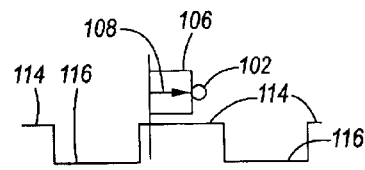
FIGS. 6A–6E depict the positions of the magnetic sensor according to the present invention at various points of FIG. 5
Figure 6B:
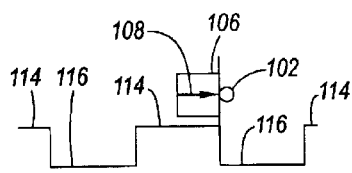
Figures 6C, 6D:
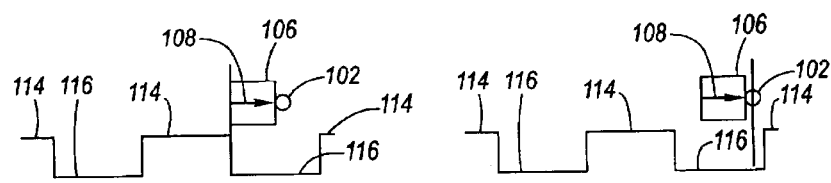
Figure 6E:
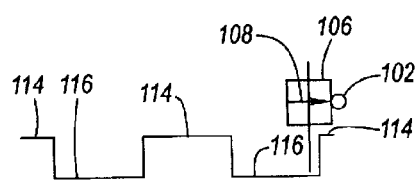

FIG. 5 depicts a finite element plot 500 of magnetic flux density components 124, according to the configuration of FIG. 2, which is analogous to the plots of FIGS. 3 and 4, and which represents a double frequency output of the magnetic sensor 100 per tooth pitch P, wherein the tooth width 126 and slot width 128 are equal to 7.25 mm and the permanent magnet length 120 is 3 mm.

FIGS. 6A through 6E depict positions of the permanent magnet 106 relative to the toothed wheel at points A through E, respectively, of FIG. 5. Referring first to point A of FIG. 5 and simultaneously to position depicted at FIG. 6A, Conditions 1 and 3 are realized, resulting in a maximum at point A, but the angle A is large because a tooth 114 is directly below the permanent magnet 106, therefore condition 2 is not realized. At point B in FIG. 5 and the position depicted at FIG. 6B, condition 3 is realized, but neither conditions 1 or 2 are realized, resulting in a minimum at point B. At point C in FIG. 5 and the position depicted at FIG. 6C, conditions 2 and 3 are realized resulting in a maximum at point C. Referring now to point D in FIG. 5 and the position depicted at FIG. 6D, conditions 1 and 2 are realized thereby maintaining the magnetic sensor 100 output maximum at point D. Referring finally to point E in FIG. 5 and the position depicted at FIG. 6E, condition 1 is realized but conditions 2 and 3 are not realized resulting in a minimum at point E. Therefore, a double frequency output results when the permanent magnet length 120 is, preferably, no longer than 50% of the slot width 128 whereby the tooth width 126 and slot width are, preferably, the same.

In some applications, it is desirable for a position sensor to also detect the direction of wheel rotation. Referring to the curves or plots of FIGS. 3, 4 and 5, the slopes of each plot going from minimum to maximum, and from maximum to minimum, are different. These different slopes can be tailored by design to accentuate the contrast between steep and less steep slopes on either side of a maximum. For example, when the wheel is rotating clockwise, the steeper slope can occur when the output is rising to a maximum and, when the wheel is rotating counterclockwise, the steeper slope can occur when the output is falling to a minimum (or vice-versa).

Figure 1B:
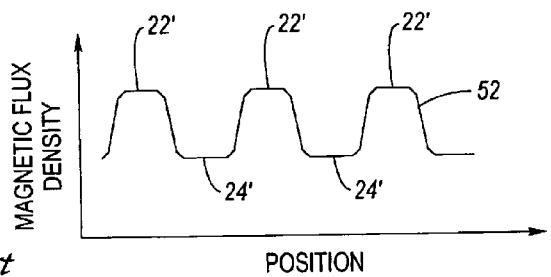
FIG. 1B is a plot of the detected magnetic flux density according to the prior art magnetic sensor of FIG. 1A.
Figure 7:
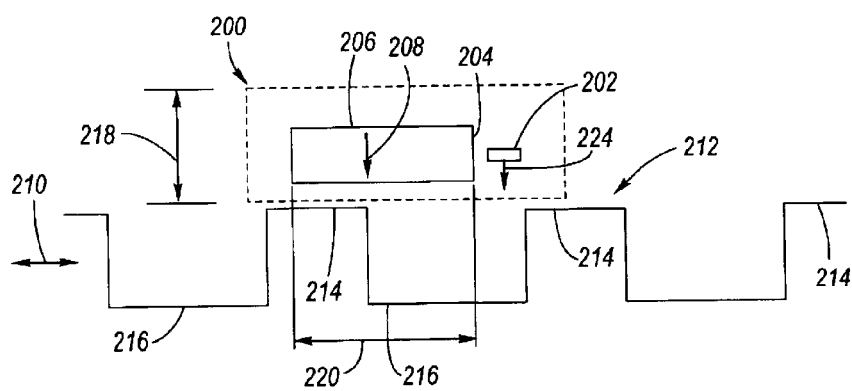
FIG. 7 depicts a second embodiment of the magnetic sensor according to the present invention.

FIG. 7 depicts a second embodiment of the magnetic sensor 200 according to the present invention. The magnetic sensor 200 incorporates an MS element 202 mounted on the side surface 204 of a permanent magnet (bias magnet) 206 magnetized in a direction 208 perpendicular to the direction of motion 210 of target wheel 212 having teeth 214 and slots 216. The location of the MS element 202 on the magnet side surface 204, rather than between the magnet 206 and target wheel 212, decreases the overall package thickness 218 compared to the prior art magnetic sensor 50 since the MS element, connecting wires, leadframe, bonding, and protective layers (not shown) are now removed from the overall thickness. Another advantage of the present invention is that the MS element 202 and its connections (not shown), which are the most fragile parts, are located away from the target wheel 212 resulting in a more robust design. Magnetic sensor 200 is also more amenable to electronic integration, in that the MS element 202 can more easily be connected or combined with electronic circuitry (not shown). It is to be understood that the MS element 202 can be either a type A element or a type B element sensitive to the component of magnetic flux density 224. The changes in magnetic flux density detected by the MS element 202 are analogous to that of the prior art magnetic sensor as depicted in FIG. 1B.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A magnetic sensor comprising:
   a bias magnet having a bottom surface and at least one side surface oriented generally perpendicularly in relation to said bottom surface, said bias magnet providing a magnetic field;
   a magnetically sensitive element facingly adjacent said at least one side surface of said bias magnet; and
   a magnetic target located adjacent said bottom surface of said bias magnet and adjacent said magnetically sensitive element disposed in movable relation with respect thereto, said magnetic target comprising a plurality of predetermined magnetic irregularities which magnetically affect said magnetic field of the bias magnet sensed by the magnetically sensitive element as said magnetic target moves in relation to said bias magnet and said magnetically sensitive element;

wherein said magnetic field of said bias magnet is oriented substantially parallel to a direction of movement of said magnetic irregularities of said magnetic target;

wherein said magnetically sensitive element is sensitive to a component of said magnetic field which is parallel to the direction of movement; and wherein said magnetically sensitive element is aligned with said bias magnet parallel to the direction of movement of said magnetic irregularities.

2. The magnetic sensor of claim 1, wherein said plurality of magnetic irregularities comprise a serially arranged pattern of teeth and slots, each tooth being separated from an adjacent tooth by a respective slot, wherein the slots have a predetermined slot width in the direction of the movement, and said bias magnet has a predetermined magnet length in the direction of the movement.

3. The magnetic sensor of claim 2, wherein said magnet length is greater than substantially fifty percent of said slot width, wherein said magnetically sensitive element provides a single frequency output signal in response to movement of said magnetic irregularities of said magnetic target.

4. The magnetic sensor of claim 3, wherein said output signal has a maximum and a minimum, wherein a first slope pertains to said output signal going from said minimum to said maximum and a second slope pertains to said output signal going from said maximum to said minimum, wherein said first and second slopes are mutually different.

5. The magnetic sensor of claim 3, wherein said magnetically sensitive element is selected from the group comprising a Hall effect device, a semiconductor magnetoresistor, a permalloy magnetoresistor and a giant magnetoresistor.

6. The magnetic sensor of claim 5, wherein said magnetically sensitive element has a lower edge located in substantial alignment with said bottom surface of said bias magnet.

7. The magnetic sensor of claim 3, wherein said magnet length is at least substantially between seventy percent and one hundred percent of said slot width.

8. The magnetic sensor of claim 7, wherein said output signal has a maximum and a minimum, wherein a first slope pertains to said output signal going from said minimum to said maximum and a second slope pertains to said output signal going from said maximum to said minimum, wherein said first and second slopes are mutually different.

9. The magnetic sensor of claim 8, wherein said magnetically sensitive element has a lower edge located in substantial alignment with said bottom surface of said bias magnet.

10. The magnetic sensor of claim 2, wherein said magnet length is less than substantially fifty percent of said slot width, wherein said magnetically sensitive element provides a double frequency output signal in response to movement of said magnetic irregularities of said magnetic target.

11. The magnetic sensor of claim 10, wherein said magnetically sensitive element is selected from the group comprising a Hall effect device, a semiconductor magnetoresistor, a permalloy magnetoresistor and a giant magnetoresistor.

12. The magnetic sensor of claim 11, wherein said magnetically sensitive element has a lower edge located in substantial alignment with said bottom surface of said bias magnet.

13. A magnetic sensor comprising:

a bias magnet having a bottom surface and at least one side surface oriented generally perpendicularly in relation to said bottom surface, said bias magnet providing a magnetic field;

a magnetically sensitive element facingly adjacent said at least one side surface of said bias magnet; and a magnetic target located adjacent said bottom surface of said bias magnet and adjacent said magnetically sensitive element disposed in movable relation with respect thereto, said magnetic target comprising a plurality of predetermined magnetic irregularities which magnetically affect said magnetic field of the bias magnet sensed by the magnetically sensitive element as said magnetic target moves in relation to said bias magnet and said magnetically sensitive element, wherein a space formed between said bottom surface of said bias magnet and said magnetic target is free of any magnetically sensitive element;

wherein said magnetic field of said bias magnet is oriented substantially perpendicular to a direction of movement of said magnetic irregularities of said magnetic target, and wherein said magnetically sensitive element is sensitive to a component of said magnetic field which is perpendicular to the direction of movement; and wherein said magnetically sensitive element is aligned with said bias magnet parallel to the direction of movement of said magnetic irregularities.

14. The magnetic sensor of claim 13, wherein said magnetic irregularities comprise a serially arranged pattern of teeth and slots, each tooth being separated from an adjacent tooth by a respective slot.

15. A magnetic sensor comprising:

a bias magnet having a bottom surface and at least one side surface oriented generally perpendicularly in relation to said bottom surface, said bias magnet providing a magnetic field;

a magnetically sensitive element facingly adjacent said at least one side surface of said bias magnet; and a magnetic target located adjacent said bottom surface of said bias magnet and adjacent said magnetically sensitive element disposed in movable relation with respect thereto, said magnetic target comprising a plurality of predetermined magnetic irregularities which magnetically affect said magnetic field of the bias magnet sensed by the magnetically sensitive element as said magnetic target moves in relation to said bias magnet and said magnetically sensitive element;

wherein said magnetic field of said bias magnet is oriented substantially parallel to a direction of movement of said magnetic irregularities of said magnetic target, and wherein said magnetically sensitive element is sensitive to a component of said magnetic field which is parallel to the direction of movement;

wherein said plurality of magnetic irregularities comprise a serially arranged pattern of teeth and slots, each tooth being separated from an adjacent tooth by a respective slot, wherein the slots have a predetermined slot width in the direction of the movement, and said bias magnet has a predetermined magnet length in the direction of the movement; and wherein said magnet length is less than substantially fifty percent of said slot width, wherein said magnetically sensitive element provides a double frequency output signal in response to movement of said magnetic irregularities of said magnetic target.

16. The magnetic sensor of claim 15, wherein said magnetically sensitive element is selected from the group comprising a Hall effect device, a semiconductor magnetoresistor, a permalloy magnetoresistor and a giant magnetoresistor.

17. The magnetic sensor of claim 16, wherein said magnetically sensitive element has a lower edge located in substantial alignment with said bottom surface of said bias magnet.

\* \* \* \* \*